(12) United States Patent
Veiga et al.

(10) Patent No.: US 9,396,076 B2
(45) Date of Patent: Jul. 19, 2016

(54) CENTRALIZED VERSION CONTROL SYSTEM HAVING HIGH AVAILABILITY

(71) Applicant: Oracle International Corporation, Redwood Shores, CA (US)

(72) Inventors: Paulo Gustavo Veiga, Buenos Aires (AR); Ignacio Manzano, Buenos Aires (AR); Juan Ignacio Vimberg, Buenos Aires (AR); Ariel Morelli Andres, Buenos Aires (AR)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 66 days.

(21) Appl. No.: 13/913,026

(22) Filed: Jun. 7, 2013

(65) Prior Publication Data

US 2014/0365811 A1   Dec. 11, 2014

(51) Int. Cl.
*G06F 11/00* (2006.01)
*G06F 11/20* (2006.01)
*G06F 11/14* (2006.01)

(52) U.S. Cl.
CPC ........ *G06F 11/2041* (2013.01); *G06F 11/1425* (2013.01); *G06F 11/2028* (2013.01)

(58) Field of Classification Search
CPC .............. G06F 11/0709; G06F 11/142; G06F 11/1425; G06F 11/1448; G06F 11/2002; G06F 11/2028; G06F 11/2041; G06F 8/70; G06F 8/71

USPC ......................................................... 714/4.12
See application file for complete search history.

(56) References Cited

U.S. PATENT DOCUMENTS

| 6,748,381 B1 * | 6/2004 | Chao ..................... G06F 11/182 |
| 7,590,886 B2 * | 9/2009 | Moscirella .......... G06F 11/2023 714/13 |
| 2002/0161889 A1 * | 10/2002 | Gamache ............ G06F 11/1482 709/226 |
| 2004/0133444 A1 * | 7/2004 | Defaix ...................... G06F 8/71 717/122 |
| 2007/0061383 A1 * | 3/2007 | Ozawa ................ G06F 11/2041 |
| 2010/0114826 A1 * | 5/2010 | Voutilainen ......... G06F 11/1425 707/638 |

* cited by examiner

*Primary Examiner* — Bryce Bonzo
*Assistant Examiner* — Anthony J Amoroso
(74) *Attorney, Agent, or Firm* — Tucker Ellis LLP

(57) ABSTRACT

A Version Control System (VCS) and methods having high availability, and combining the advantages of a centralized VCS while overcoming the limitations of centralized VCSs in a cluster environment. The system and method copes with failures of components in a cluster environment gracefully to guarantee uptime. The VCS and methods support high availability in a centralized VCS utilizing a plurality of repositories having a suitable architecture. In particular embodiments the architecture utilizes one or more of: Active-Passive repository replication; Active-Passive repository replication with automatic recovery; Active-Active repository replication; and hybrid model (Active-Active and Passive repository replication).

17 Claims, 4 Drawing Sheets

CENTRALIZED VERSION CONTROL SYSTEM HAVING HIGH AVAILABILITY

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to version control systems and in particular to version control systems having high availability.

BACKGROUND

Version Control Systems (VCS) provide for the management of changes to documents or any other collection of information. A VCS provides the ability to keep track of changes, revert a document to a previous revision, etc. These features make Version Control Systems (VCS) a suitable solution for persisting artifacts in a development environment.

In particular a centralized VCS provides additional capabilities (such as: centralized access control, one single source of authoritative data, etc.) that makes a centralized VCS advantageous in a development environment.

A disadvantage of centralized VCS becomes apparent in cluster environments used by thousands of client systems. In such large systems failures of hardware components in the cluster are the norm, not the exception. Unfortunately in cluster environments, a centralized VCS does not deal with such failures gracefully and therefore cannot guarantee high availability. Due to the architecture of the centralized VCS, a single repository failure can cause complete denial of service for all users. As a consequence, centralized VCSs are fragile and do not scale very well making them unsuitable as persistent storage of artifacts in a cluster environment.

Accordingly it would be desirable to provide a VCS having the advantages of a centralized VCS while dealing with failures of components in a cluster environment gracefully to guarantee uptime.

It would further be desirable to provide a VCS having the advantages of a centralized VCS without the inherent fragility and which therefore scales well making it suitable for persistent storage in a cluster environment.

SUMMARY

Embodiments of the present invention provide Version Control Systems (VCS) and methods having high availability.

Embodiments of the present invention provide a high availability VCS and method which has the advantages of a centralized VCS while overcoming the limitations of centralized VCSs in a cluster environment.

Embodiments of the present invention provide a high availability VCS and method having the advantages of a centralized VCS while dealing with failures of components in a cluster environment gracefully to guarantee uptime.

Embodiments of the present invention provide a VCS having the advantages of a centralized VCS without the inherent fragility and which therefore scales well making it suitable for persistent storage in a cluster environment.

In an embodiment the present invention provides a VCS which supports high availability in a centralized VCS utilizing a plurality of repositories having a suitable architecture. In particular embodiments the architecture utilizes one or more of: Active-Passive repository replication; Active-Passive repository replication with automatic recovery; Active-Active repository replication; and hybrid model (Active-Active and Passive repository replication).

Other objects and advantages of the present invention will become apparent to those skilled in the art from the following detailed description of the various embodiments, when read in light of the accompanying drawings.

DETAILED DESCRIPTION

Figure 1:
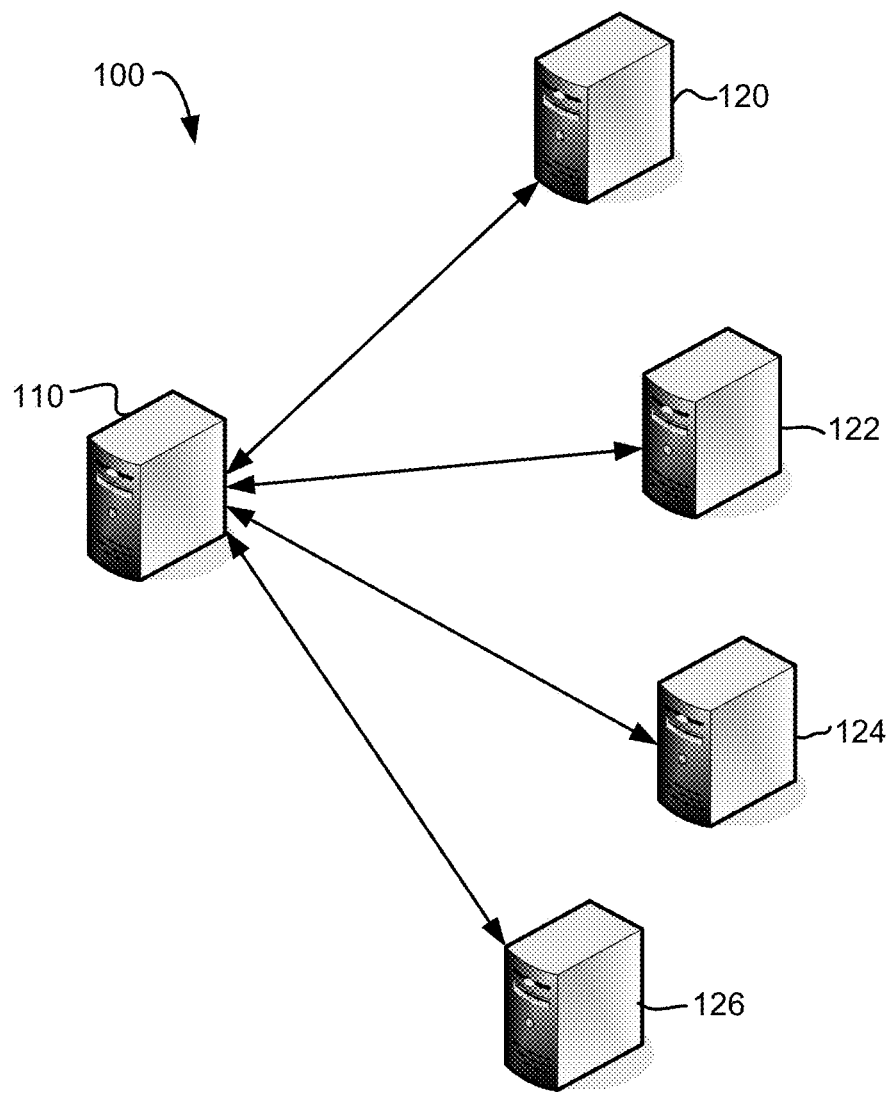
FIG. 1 shows a VCS utilizing an Active-Passive Repository Replication schema according to an embodiment of the invention.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is provided for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

Common reference numerals are used to indicate like elements throughout the Figures and detailed description; therefore, reference numerals used in a Figure may or may not be referenced in the detailed description specific to such figure if the element is described elsewhere. The first digit in a three digit reference numeral indicates the series of Figures in which the element first appears.

Although the Figures depict components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

Version Control Systems (VCS) provide for the management of changes to documents or any other collection of information. A VCS provides the ability to keep track of each change, revert a document to a previous revision, etc. When data in the VCS is modified, after being retrieved (read) by checking out, this is not in general immediately reflected in the repository of the VCS, but must instead be checked in or committed (write). These features make Version Control Systems (VCS) a suitable solution for persisting artifacts in a development environment. VCSs are often centralized, with a single authoritative data store, the repository, and reads and commits are performed with reference to this central repository. A centralized VCS provides additional capabilities (such as: centralized access control, one single source of authoritative data, etc.) that make them advantageous in a development environment, for example a Business Process Management development environment.

Embodiments of the present invention provide Version Control Systems (VCS) and methods having high availability. The present inventions provide a high availability Version Control System and method which has the advantages of a centralized VCS while overcoming the limitations of centralized VCSs in a cluster environment. In particular the present invention provides a VCS and method having the advantages of a centralized VCS while dealing with failures of components in a cluster environment gracefully to guarantee uptime. The VCS and method has the advantages of a centralized VCS without the inherent fragility and which therefore scales well making it suitable for persistent storage in a cluster environment.

In an embodiment the present invention provides a VCS which supports high availability in a centralized VCS utilizing a plurality of repositories having a suitable architecture.

In particular embodiments the architecture utilizes one or more of: Active-Passive repository replication; Active-Passive repository replication with automatic recovery; Active-Active repository replication; and hybrid model (Active-Active and Active-Passive repository replication) as described below.

All of the repository replication schemas utilize repository replication in which multiple copies of data are replicated across multiple hardware devices in a cluster in order to prevent data loss. Data is duplicated on different hardware nodes to provide one or more backup copies in case of the failure of a hardware node and to decrease latency of read and write operations. However, where multiple copies of data are stored, it is necessary to provide a coherent view of the repository in any moment and avoid data inconsistencies which can occur when different users make modifications to the same data.

CAP theorem (a.k.a. Brewer's theorem) states that it is impossible for a distributed system to simultaneously provide absolute: data consistency (all nodes see the same data at the same time), data availability (a guarantee that a read/write request receives whether its was successful or failed), and data partition tolerance (the system continues to operate despite arbitrary message loss or failure of part of the system). A principal objective of a centralized VCS as persistence storage for a highly concurrent application is data consistency. Accordingly the present solution favors consistency and availability over partition tolerance.

Furthermore the VCS and method also provides failure transparency such that it is not evident to a user when a node fails. An advantageous aspect of the VCS and method is that the user is never aware of the replication mechanism used to provide high availability. The replication is transparent to the user. Furthermore the user interacts with the VCS exactly as he would on any usual occasion. This transparency permits the system operator to dynamically change the composition of the cluster without impact on the user experience.

1A. Active-Passive Repository Replication

In Active-Passive Repository replication schema, there are multiple nodes which are a copy of the repository, but only one of them is regarded as the source of authoritative data. This node is called the "active" or "master" while the others are "passive" or "slave". Passive nodes synchronize directly from the active node. If the active node is unavailable, the passive nodes switch to read-only mode until the active node becomes available.

FIG. 1 shows a VCS 100 utilizing an Active-Passive Repository Replication schema according to an embodiment of the invention. As shown in FIG. 1A, VCS 100 is distributed on a cluster of nodes comprising an active master node 110 in communication with a plurality of passive nodes 120, 122, 124, and 126. In this schema, there are multiple nodes with the repository information, but only one of them, master node 110, is the source of authoritative data. Master node 110 will be the "active" one and can also be called "master". Because master node 110 is the source of authoritative data, every write operation over the repository has to be performed in master node 110. The passive nodes 120, 122, 124, and 126, can retrieve the information from the active node 110, listen for changes to the data in the master node 110 and stay synchronized. User clients can to connect to passive nodes and retrieve information from them. However, if a commit (write request) is requested to a passive node, the passive node will internally forward the request to the active one. Thus, the client is unaware that it is connected to a passive node.

In the Active-Passive Repository Replication schema, writes can only occur on the master, while the slaves can only retrieve the information, listen for changes, and stay synchronized with the active node. However, when a user is connected to a passive node all write requests are internally forwarded to the master—therefore the user can't tell the difference when connected to a passive node. Having a single writing point ensures us that no conflict of concurrent modification can arise. On the other hand as a consequence of this restriction, the entire writing load relies on a single node instead of being distributed. This can cause congestion in a large system.

The main disadvantage of this first configuration is that when the active node goes down users will be able to read from the repository but not to write to it. It is undesirable in this schema to resolve the failure by choosing an available passive node and converting it to a master without human intervention. For example, in a case where the network gets partitioned, if passive nodes are promoted to master nodes, the result could be two or more different nodes acting as masters causing the history to diverge and provoking an inconsistent view of the data depending on which partition the user is connected to. Since a VCS should prefer consistency over availability, divergent history should be avoided. Thus, it is preferable to declare the system as down for writes until an administrator manually sets up a new primary node. Thus the Active-Passive schema supports high availability primarily for the reads whereas the writes depend upon a single (primary) system.

Another disadvantage of this configuration is that the active node has more responsibilities than the passive nodes. Reads can be distributed across the passive nodes, but writes must all be handled on the active node. Consequently there may be congestion in the active node. Additionally, the passive nodes may exhibit a certain level of desynchronization owing to the time required to distribute commits from the active node to the passive nodes. During the synchronization delays, read operations against a passive node may have increased latency to allow the passive node to be synchronized before providing the data.

1B. Active-Passive Repository Replication with Automatic Recovery

As described above, in the Active-Passive schema, when the active node fails, it is preferable to simply declare the system as down for writes until an administrator manually sets up a new primary node. However, the Active-Passive Repository Replication schema can be enhanced with automatic failure recovery. Automatic failure recovery uses a technique dubbed 'quorum' (also called 'consensus') to decide which member should become primary. Using quorum means that whenever the primary node becomes unreachable, the secondary nodes trigger an election. The first node to receive votes from a majority of the set of secondary nodes will become the primary node. This means that for a passive node to take the role of active node at least a number N nodes have to be up and running and successfully accepted the decision. That N is called quorum. In a simple schema, the N=(total nodes in the cluster)/2+1. This provides automated failover while preventing the previously mentioned case of divergent history in case of network partition.

There is, however, one particular case in which this configuration requires manual intervention to recover a possible lost commit. This is in the case of a failover situation in which the primary node has accepted a write operation that has not been replicated to the secondary nodes after the failover occurs. In this particular case the node selected to take the place of the primary will have no knowledge of this last commit. Therefore to avoid consistency issues that last commit is saved in a particular location for the admin to recover and this commit is applied manually. This situation could be considered the worst case scenario. Please note that in contrast with the abovementioned Active-Passive Repository Replication without automatic recovery, manual intervention is needed only to recover a particular commit while the system as a whole will choose a new primary automatically and continue working as expected. Thus, the effect on the user of a failure of the primary node is significantly reduced.

2. Active-Active Repository Replication

In the Active-Active Repository Replication schema, there are multiple nodes with authoritative repository information. Although the master role will still exist in this schema, the master responsibilities can be switched from node to node. If the master goes down, another node can take over the responsibility of the master node and claim itself as a master. Thus, in this schema we all the nodes can be viewed as masters able to write on the repository.

Figure 2:
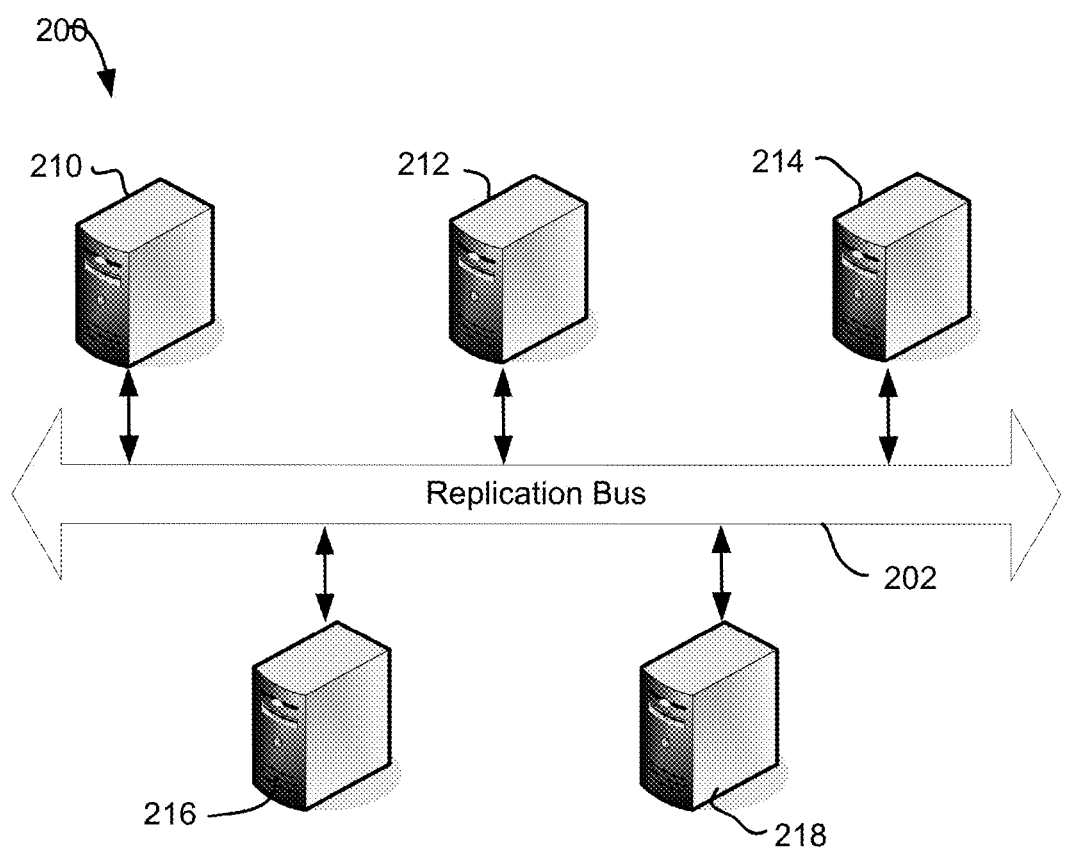
FIG. 2 shows a VCS utilizing an Active-Active Repository Replication schema according to an embodiment of the invention.

FIG. 2 shows a VCS utilizing an Active-Active Repository Replication system 200 according to an embodiment of the invention. As shown in FIG. 2, a plurality of active nodes 210, 212, 214, 216, and 218 communicate with one another over a replication bus 202. Read and write operations may be performed on any of the active nodes.

Because writes may be made to any active node, the system could develop data inconsistency due to concurrent modifications over the repository at different nodes. To solve this issue all nodes have to negotiate each write operation to obtain a majority of nodes to accept the modifications introduced on the repository. This requires use of two techniques: two phase commit and "quorum", the same technique used for primary selection but in this case applied to commits' acceptance. Using quorum in this context means that to succeed in a write operation a majority of the nodes forming the cluster at the time of writing have to be up and running and successfully accept the commit without any failure. Then, when the write operation is successful, all other nodes are notified via a notification bus, and replicate the change from one of the nodes that accepted the request.

In this configuration there is no single point of failure since any active node can take the place of another in the quorum. This provides high availability for both reading and writing in the repository. However, the semantics of the two phase commit and a required undo primitive are more complex than for commits in the Active-Passive repository schema and generate additional transaction overhead. If the quorum is not satisfied, all the write (commit) operations will be rejected, however read operations will still be allowed. Moreover, the use of quorum for each commit generates significantly more communication overhead between the nodes. This is disadvantageous for large distributed systems having significant communication latency.

3. Hybrid Model

Figure 3:
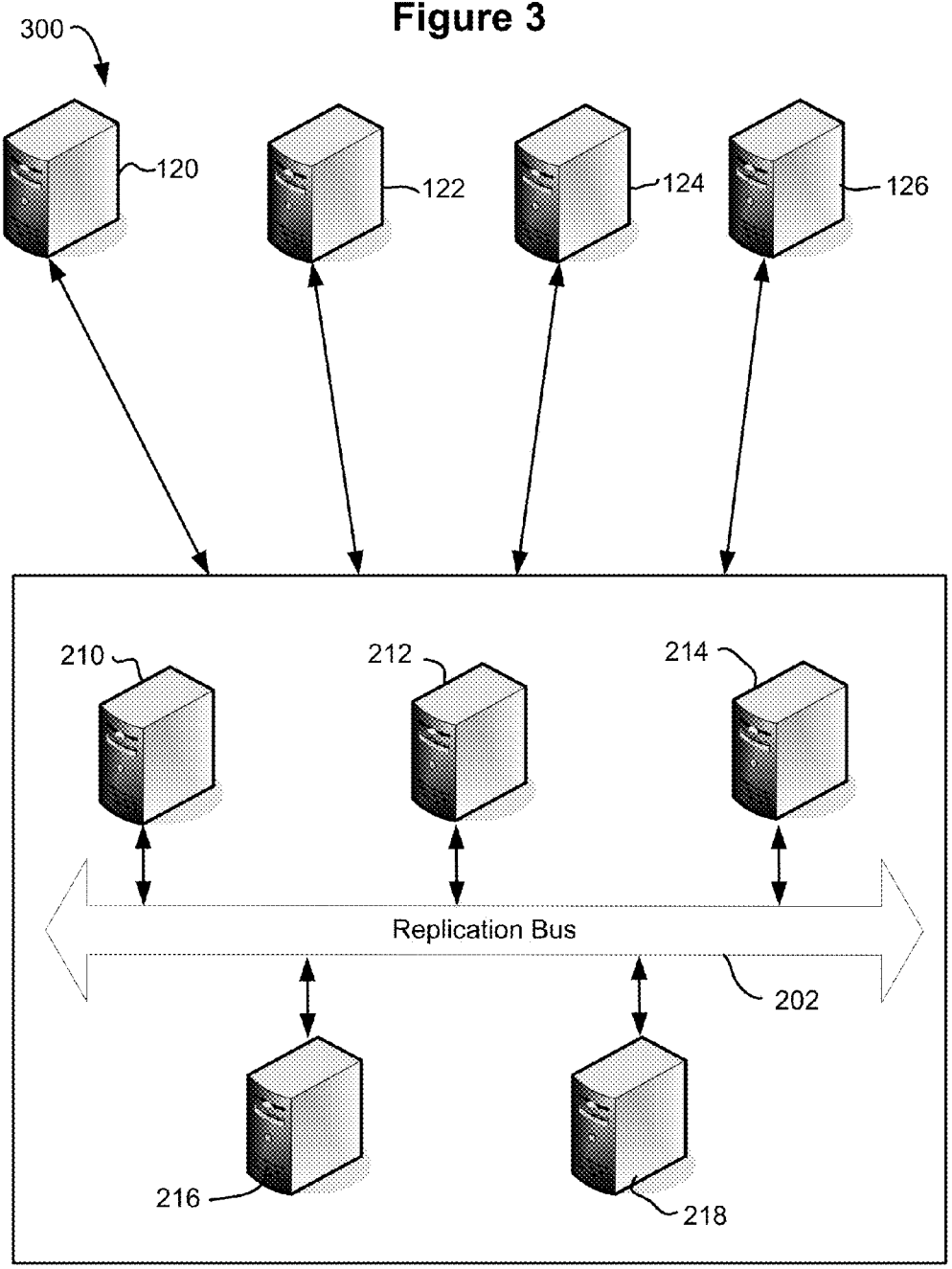
FIG. 3 shows a VCS utilizing a Hybrid Repository Replication schema according to an embodiment of the invention.

In the Hybrid Model, it is possible to configure an architecture in which Active-Passive Repository Replication and Active-Active Repository Replication are used together in a cluster. For example in some cases it is advantageous to run Active-Active Repository Replication on a small number of nodes (for example 5 nodes) located on the same data center (facilitating high bandwidth communication between the nodes) and fifty or so passive nodes situated at different locations around the globe providing the user quick read access to the repository. The availability of multiple nodes within the small number of active nodes), also reduces the overhead on the write function, reduces congestion, and increases the failure tolerance as compared to a single master system. Furthermore, the interaction between the master group and the passive nodes utilizes the less complex and less communication intensive mechanisms of the Active-Passive Repository Replication schema which is better suited for large geographically distributed systems FIG. 3 shows a VCS utilizing a Hybrid Repository Replication schema according to an embodiment of the invention. As shown in FIG. 3, a group of five active nodes 210, 212, 214, 216, 218 communicating over a replication bus 202 and utilizing the Active-Active Repository Replication schema together operate as a master node 302. The master node combination 302 communicates directly with the passive nodes 120, 122, 124, 126 in the same way as master node 110 of FIG. 1. However, in this configuration, the master node combination 302 is more fault tolerant than the single master node of FIG. 1 because it does not rely on a single server. Additionally as several master nodes are available within master node combination 302 the master node combination 302 is better able to deal with requests from the passive nodes.

The Hybrid model thus combines advantageous features of both the Active-Passive Repository Replication Schema and the Active-Active Repository Replication Schema. Additionally, in the Hybrid model, the configuration can be changed dynamically by adding or removing servers to the cluster without user impact. This can be achieved thanks to the node state machine described in the next section.

Node Communication

In embodiments of the present invention, the system and method utilizes two different types of communication, these are: node to node communication, and node to cluster communication (or broadcast). Node to node communication is used when it is desired to have a commit replicated to another server. Node to node communication makes use of the VCSs own functionality to replicate history to a different repository. Node to cluster communication is used as a way of notifying a writing event to all nodes. Node to cluster communication makes use of a distributed cache to provide a message queue with a write-through configuration for persistence.

Node State

When the administrator sets up a new node, before this node can take requests it has to be synchronized with the latest data on the repository. A node state machine is used to synchronize the new node with the latest data. When a triggering event occurs (a new node added to cluster, master node has been detected to be down, etc.), the node will change its internal state. The node behavior will depend on the state it has.

Figure 4A:
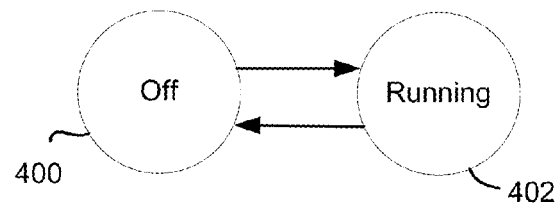
FIGS. 4A and 4B illustrate node state diagrams for active and passive nodes according to embodiments of the invention.
Figure 4B:
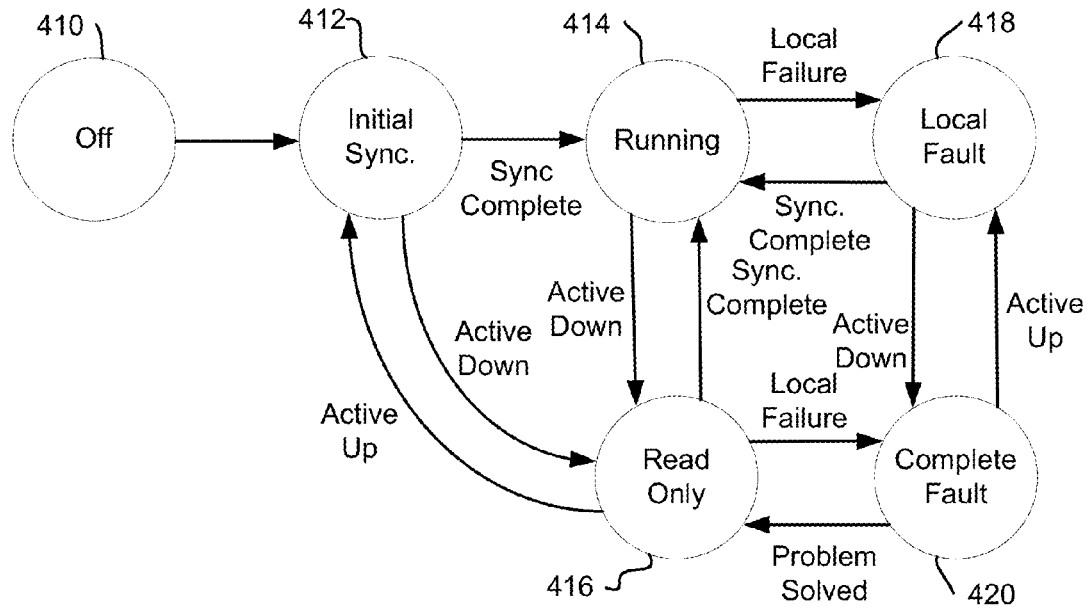

FIGS. 4A and 4B illustrate node state diagrams for active and passive nodes according to embodiments of the invention. As shown in FIG. 4A, the active node can be in two states. In the Off state 400, the active node is in shutdown. In the Running state 402 the active node can accept read and write requests. When the active node is started (transition from Off state to Running state), the passive nodes are signaled to check whether they are up to date or whether they need to synchronize with the active node.

As shown in FIG. 4B, the passive nodes have more internal states. In the Off state 410, the passive node is in shutdown. In the Initial Sync. state 412, the passive node retrieves the latest information from the active node before accepting any request. In the Running state 414, the passive node will accept read and write requests (note that the write requests are forwarded to the active node). In the Read Only state 416, the passive node will only accept only read operations. This occurs, for example when the active node cannot be reached. In the Local Fault state 418, a local fault occurred during the synchronization process. In the Complete Fault state 420, there is a local fault and the master node is down.

As shown in FIG. 4B, when starting a passive node, it goes to the Initial Sync state. In the Initial Sync. state the passive node checks how many commits should be synchronized against the active node. Optionally the passive node can also check if there is another passive node that is more synchronized. Using the optional mechanism, if there is another passive node that is closely synchronized with the active node, the initialized passive node can get synchronized in two stages: first against the passive node that is closely synchronized with the active node; and second against the active node to be fully synchronized. If there isn't any passive node closely synchronized with the active node, then the passive node should synchronize directly from the active node. This optional mechanism reduces the workload on the active node when new passive nodes are initialized.

Where a commit has been performed in the active node, the active node should publish the commit revision through to the passive node using the node to cluster communication mechanism. The passive nodes are encouraged to read the commit information from the node to cluster communication mechanism as soon as possible. The active node may optionally publish the commit content so that the passive nodes can replicate such information. If the commit content was not published by the active node, then passive nodes should request the commit content to the active using the mode to node communication mechanism.

If a client connects to a passive node for a read request and the passive node status is running or read only, then it will serve the request using the information stored locally. If the node is in other state, it will forward the request to the active node.

If a client connected to a passive node tries to perform a commit operation, the passive node will forward the request to the active node. If the commit finishes successfully, the passive node will not communicate that to the client until the new commit gets synchronized. Once the commit gets synchronized, the client will receive the success confirmation.

This procedure ensures that all the written data can then be immediately found by client. If the active node goes down while the passive node was synchronizing the new commit, the passive node will respond to the client with the new commit information. In this case, if the client comes back to the node before the active node comes back, most client operations will fail because the client will be more updated than the passive node.

Metadata Store

To maintain the cluster configuration (the names and location of the different machines that conform the cluster, the configuration chosen for each machine, the path of the repositories, etc.) another high availability storage is required to provide a Metadata store. The metadata store should be high availability to prevent a failure in the Metadata store causing the whole system to go down. In a particular embodiment the Metadata store is provided in a distributed cache with a write-behind configuration over database.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A high availability system comprising:
   a plurality of nodes in a cluster environment each node comprising one or more microprocessor;
   a version control system operating on said plurality of nodes, wherein the version control system provides for management of a plurality of documents and changes to said plurality of documents such that the version control system can provide a plurality of versions of each of said plurality of documents;

a version control data repository replicated across said plurality of nodes, wherein the version control repository persists artifacts associated with said plurality of documents and changes to said plurality of documents;

wherein the plurality of nodes defines a schema designed to cope with failure of a one or more nodes of said plurality of nodes;

wherein the plurality of nodes include an active node and a plurality of passive nodes;

wherein each of the plurality of passive nodes maintains a local replica of the version control repository which includes a copy of all of said artifacts associated with said plurality of documents and changes to said plurality of documents; and wherein each of the plurality of passive nodes enables read operations and write operations on said artifacts persisted in said version control repository by providing read access to said local replica of said version control repository which includes the copy of all of said artifacts associated with said plurality of documents and changes to said plurality of documents and forwarding write operations to said active node.

2. The high availability system of claim 1, wherein the plurality of nodes defines an Active-Passive Repository Replication schema with automatic recovery.

3. The high availability system of claim 1, wherein:
upon failure of the active node, the passive nodes elect a replacement active node from among the plurality of passive nodes utilizing a consensus mechanism.

4. The high availability system of claim 1, wherein the plurality of nodes defines an Active-Active Repository Replication schema comprising a plurality of active nodes, wherein each of said plurality of active nodes enables write operations on said artifacts persisted in said version control repository and wherein said write operations are synchronized with each other of said plurality of active nodes using a two-phase commit transactions.

5. The high availability system of claim 1, wherein the plurality of nodes comprises a plurality of active nodes in communication over a replication bus; and
wherein each of said plurality of active nodes enables write operations on said artifacts persisted in said version control repository and wherein said write operations are synchronized with each other of said plurality of active nodes using two-phase commit transactions; and
wherein the active nodes utilize a consensus mechanism to control each commit of each two-phase commit transaction to the plurality of active nodes.

6. The high availability system of claim 1, wherein the plurality of nodes defines a hybrid model including a plurality of nodes in an Active-Passive Repository Replication schema and a plurality of nodes in an Active-Active Repository Replication schema.

7. A method for achieving high availability in a system comprising a plurality of nodes in a cluster environment, the method comprising:
providing a version control system operating on said plurality of nodes, wherein the version control system provides for management of a plurality of documents and changes to said plurality of documents such that the version control system can provide a plurality of versions of each of said plurality of documents;

replicating a version control data repository across said plurality of nodes, wherein the version control repository persists artifacts associated with said plurality of documents and changes to said plurality of documents;

operating said plurality of nodes according to a schema designed to cope with failure of a one or more nodes of said plurality of nodes;

configuring an active node and a plurality of passive nodes from the plurality of nodes, wherein each of the plurality of passive nodes maintains a local replica of the version control repository which includes a copy of all of said artifacts associated with said plurality of documents and changes to said plurality of documents; and enabling read operations and write operations on said artifacts persisted in said version control repository at each of the plurality of passive nodes by providing read access to said local replica of said version control repository which includes the copy of all of said artifacts associated with said plurality of documents and changes to said plurality of documents and forwarding write operations to said active node.

8. The method of claim 7, comprising operating said plurality of nodes according to an Active-Passive Repository Replication schema with automatic recovery.

9. The method of claim 7, wherein operating said plurality of nodes comprises:
upon failure of the active node, causing the passive nodes to elect a replacement active node from among the plurality of passive nodes utilizing a consensus mechanism.

10. The method of claim 7, comprising:
operating said plurality of nodes according to an Active-Active Repository Replication schema;
configuring a plurality of active nodes, wherein each of said plurality of active nodes enables write operations on said artifacts persisted in said version control repository; and
synchronizing write operations between said plurality of active nodes using two-phase commit transactions.

11. The method of claim 7, wherein operating said plurality of nodes comprises:
configuring a plurality of active nodes, wherein each of said plurality of active nodes enables write operations on said artifacts persisted in said version control repository;
synchronizing write operations between said plurality of active nodes using two-phase commit transactions;
providing a replication bus for communication of two-phase commit transactions between the plurality of active nodes; and
utilizing a consensus mechanism to control each commit to the plurality of active nodes.

12. The method of claim 7, comprising operating said plurality of nodes according to a hybrid model including a plurality of nodes in an Active-Passive Repository Replication schema and a plurality of nodes in an Active-Active Repository Replication schema.

13. A non-transitory computer readable storage medium including instructions stored thereon for providing a high availability version control system on a plurality of nodes in a cluster environment, which instructions, when executed, cause the cluster environment to perform steps comprising:
providing a version control system operating on said plurality of nodes, wherein the version control system provides for management of a plurality of documents and changes to said plurality of documents such that the version control system can provide a plurality of versions of each of said plurality of documents;

replicating a version control data repository across said plurality of nodes, wherein the version control repository persists artifacts associated with said plurality of documents and changes to said plurality of documents;

operating said plurality of nodes according to a schema designed to cope with failure of a one or more nodes of said plurality of nodes;

configuring an active node and a plurality of passive nodes from the plurality of nodes, wherein each of the plurality of passive nodes maintains a local replica of the version control repository which includes a copy of all of said artifacts associated with said plurality of documents and changes to said plurality of documents; and enabling read operations and write operations on said artifacts persisted in said version control repository at each of the plurality of passive nodes each by providing read access to said local replica of said version control repository which includes a copy of all of said artifacts associated with said plurality of documents and changes to said plurality of documents and forwarding write operations to said active node.

14. The non-transitory computer readable storage medium of claim 13, wherein operating said plurality of nodes comprises:

upon failure of the active node, causing the passive nodes to elect a replacement active node from among the plurality of passive nodes utilizing a consensus mechanism.

15. The non-transitory computer readable storage medium of claim 13, wherein said steps further comprise:

configuring a plurality of active nodes, wherein each of said plurality of active nodes enables write operations on said artifacts persisted in said version control repository; and synchronizing write operations between said plurality of active nodes using two-phase commit transactions.

16. The non-transitory computer readable storage medium of claim 13, wherein said steps further comprise:

configuring a plurality of active nodes, wherein each of said plurality of active nodes enables write operations on said artifacts persisted in said version control repository; and synchronizing write operations between said plurality of active nodes using two-phase commit transactions;

providing a replication bus for communication of two-phase commit transactions between the plurality of active nodes; and utilizing a consensus mechanism to control each commit to the plurality of active nodes.

17. The non-transitory computer readable storage medium of claim 13, wherein operating said plurality of nodes comprises operating said plurality of nodes according to a hybrid model including a plurality of nodes in an Active-Passive Repository Replication schema and a plurality of nodes in an Active-Active Repository Replication schema.

* * * * *